Figure 1:
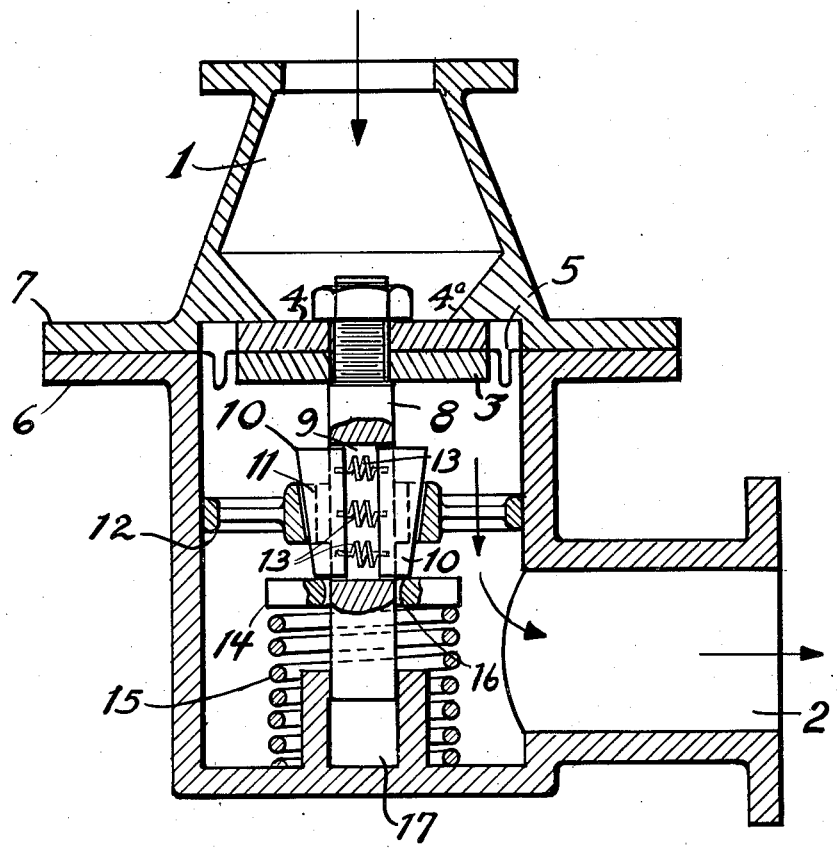
Figure 2:
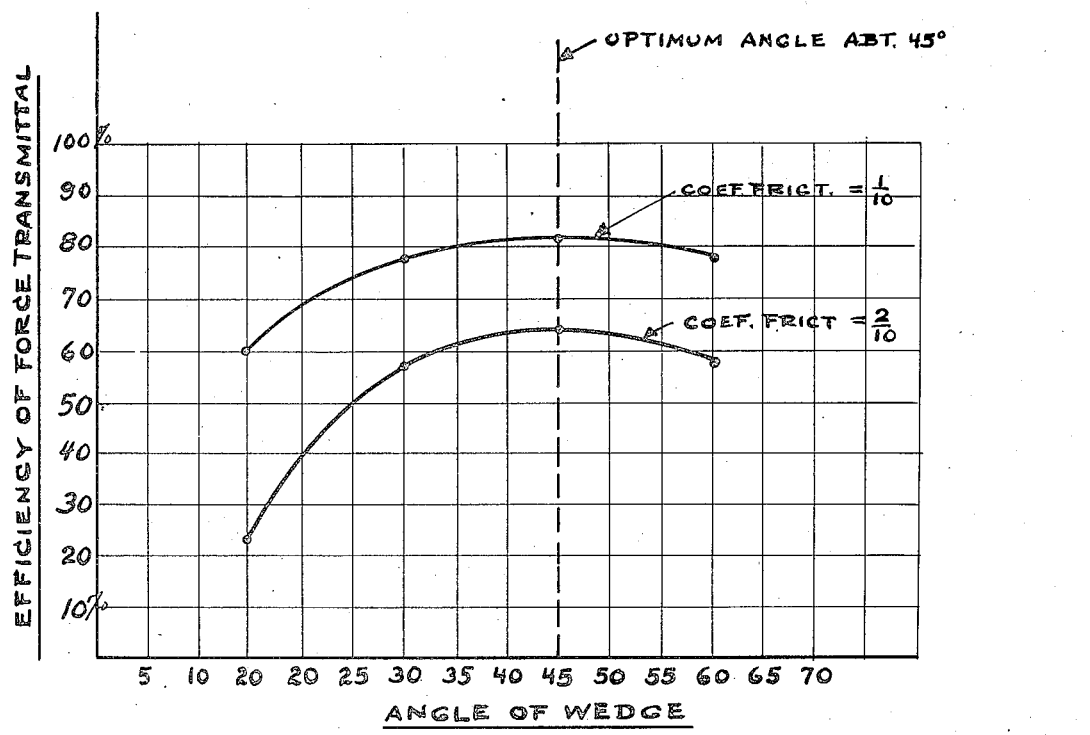

July 4, 1944.  R. W. TRYON  2,353,093
PRESSURE RELIEVING DEVICE
Filed Aug. 12, 1942   2 Sheets-Sheet 1

Richard W. Tryon Inventor
By P. L. Young Attorney

Patented July 4, 1944

2,353,093

UNITED STATES PATENT OFFICE 2,353,093

PRESSURE RELIEVING DEVICE

Richard W. Tryon, Westfield, N. J., assignor to Standard Oil Development Company, a corporation of Delaware Application August 12, 1942, Serial No. 454,497

3 Claims. (Cl. 137—53)

This invention relates to improvements in automatic release devices containing a frangible element for equipment which may be subjected to excessive pressure.

In U. S. 2,062,381 there is disclosed a frangible disc safety device in which the essential elements are an assembly consisting of a lead disc backed up on each side with steel plates transmitting the pressure load to a cast iron rod which is thereby loaded in tension. This device has been found to be very satisfactory in practical operation except when the rod is exposed to a corrosive fluid or the rod becomes fatigued as a result of the device being attached to equipment for an unusually prolonged period of time. Under such circumstances the rod fails prematurely, that is at a pressure lower than that at which the device is initially set to relieve. The present invention is an improvement over the device disclosed in U. S. 2,062,381 in that excepting for a small area of the frangible element, the operating parts are on the down stream side of the valve and factors causing fatigue are so minimized as to present no significant practical limitation in this regard upon prolonged usage.

In the device of this invention the cast iron rod of the device disclosed in U. S. 2,062,381 is replaced by a spring on the low pressure side of the frangible disc and a tripping or trigger mechanism. Moreover, the frangible disc seals the pressure inlet over a small area only and with the material arranged in a fold rather than tautly so as to permit some play of the spring mechanism without straining the disc. The pressure load is partly absorbed in the tripping mechanism and partly transmitted to the spring during normal operation of the equipment to which the release device is attached. When the predetermined release pressure is reached, the tripping mechanism releases the spring and thus the entire load is made to fall upon the frangible element. This combination of features avoids the fatigue weakness of the former device and also avoids the corrosion problem since the tripping device and the spring are separated from the fluid pressure by the frangible element.

The tripping mechanism which may be made in many ways is made to function indirectly as a result of the movement of the spring under pressure. The spring mechanism actuates the tripping device which is so designed as to trip after a predetermined amount of spring compression has occurred. In other words, the spring is made to release itself by means of an auxiliary mechanism connected with, and actuated by, the spring assembly. Thus the tripping mechanism is also a trigger mechanism. The strength of the frangible disc is very small in relation to the release pressure load. Thus a complete and clean-cut failure of the frangible element at its unsupported edge occurs.

The invention may find expression in a number of practical embodiments. A suitable form of embodiment of the invention employs a system of wedge-shaped keys which normally act as a link in the parts transmitting the load from the frangible disc assembly to the spring. The keys in this embodiment are poised upon the edge of a shelf member and are readily displaced from their support when sufficient axial compression of the spring occurs. The radial force required to do this is supplied by fixed guides which react against the wedging action of the keys. In such an embodiment the sensitivity of the device is dependent upon the reaction of the keys to be displaced from the shelf as a result of the axial compression forcing the keys into the corresponding slots in the axle or shaft. The invention will be more fully understood from the following description of the above type of embodiment when read in conjunction with the accompanying drawings.

In the drawings numerals 1 and 2 denote the valve inlet and outlet respectively. The valve inlet 1 is closed by plates 3 and 4 constituting a valve head or plate assembly made of any suitable material, such as steel or bronze or other type construction metal, preferably of anti-corrosive nature. Between these plates is arranged a diaphragm of frangible material 5. This frangible material may be metallic in character, such as a thin sheet of aluminum or lead, or it may be in some cases a rubber-like material. The sheet of frangible material also projects beyond the edges of plates 3 and 4 and the extremities are held in flanges 6 and 7. The frangible material is held between the plate combination 3 and 4 and the flanges 6 and 7 in the form of an annular loop or corrugation, thus permitting a supply of material for a certain downward motion of the plates 3 and 4. Thus the combination of the plates 3 and 4 and the frangible disc 5 completely closes the valve inlet 1. The arrangement is to have plate 4 adjusted to make a seating with an adjacent shoulder arrangement on the inner side of the metal forming the valve inlet 1. In this arrangement the disc will be protected from any corrosive influences present in equipment to which the valve is attached, as shown by 4A in the drawings.

The load from the pressure vessel is carried by the valve head or disc assembly 3, 4 and 5 and transmitted to the valve stem or shaft or axle 8. The shaft 8 is provided with a slot as indicated by the numeral 9 to accommodate, preferably completely, three or more keys or wedges 10. The shape of the wedges, that is the angle, should preferably be about 45° but it may suitably be from 30 to 60°. Figure II presents a graphical analysis of the efficiency force transmitted with the angle of the wedge at two widely different frictional values for the materials of construction of the wedges and the bearing members in the shaft and guide. The keys 10 can also be partly confined within a guide portion 11 of the spider 12. Small springs 13 are adjusted in the recesses of the slot 9 in the shaft between the wedges and the shaft wall. The springs 13 react upon the keys 10 forcing them outward. The keys are thus assembled in normal operation partly in the guide 11 and partly in the slotted portion 9 of the shaft resembling a chuck. The combination with respect to the slot 9 with the springs therein and the guide 11 in the spider or cam 12 are thus arranged so as to react when the shaft is moved downwards under a pressure equal to the predetermined released value to force the keys completely into the slot 9. The downward force of the shaft 8 is also partly transmitted to the lower member of the device, namely, the collar 14 upon which the keys 10 partly rest in normal operation as a shelf therefor. The force transmitted through the keys in normal operation to the collar 14 compresses spring 15 located beneath the collar 14. The collar 14 is grooved with slots 16 which correspond and are aligned with each of the keys 10.

In normal operation the strength of the unsupported rim of the frangible disc 5 is large in relation to its pressure area. But this section of the frangible material is relatively weak when called upon to support the main load at the moment the supporting action of the spring is lost through the action of the disconnecting mechanism. This change in loading may be tenfold, for example. The magnitude of the change in loading from the normal to the breaking condition depends upon the proportions selected in the design of the frangible material assembly. Also, in normal operation the keys 10 extend laterally beyond the edge of the slots 16 thereby transmitting the loads and permissible variations in loading to the spring 15. The amount of the load transmitted by the keys to the spring 15 is determined by the angle of the wedges 10. Also, the sensitivity of the trigger or tripping mechanism, that is the force urging the keys 10 into the slot 9 against the springs 13, is dependent upon the angle of the wedges 10, the strength of the springs 13 and the various frictional resistances impeding the inward movement of the mechanism. Obviously, the sensitivity of the trigger device, that is, the movement of the keys into the slot 9 in the shaft 8 and in the slots 16 in the collar 14, is greater the higher the angle of the wedges 10. Therefore, the angle of the wedges 10 also determines the amount of load transmitted to the springs 15. As a practical compromise it has been found that the angle of the wedges is preferably about 45°. Thus when the pressure on the frangible disc assembly 3, 4 and 5 becomes excessive, the shaft 8 tends to move downwards, transmitting the force partly to the wedge shaped keys and partly to the collar 14 and spring 15. When the safety pressure is exceeded the keys 10 are forced into the slots 9 and 16 and the shaft then moves freely downwards and disconnects the spring thus allowing the total pressure to be exerted upon the frangible disc assembly 3, 4 and 5 causing rupture of the disc 5. The downward movement of the shaft 8 and the disc assembly 3, 4 and 5 thus clears a large unobstructed opening which will accommodate a quick release for a large volume of gas or liquid. In order to provide a space for the shaft 8 the recess and dash pot 17 in the lower part of the device is furnished.

The foregoing description is illustrative only and various changes and alternative arrangements may be made within the scope of the inventive concept.

What is claimed is:

1. A pressure release device comprising a casing having two tubular openings one of said tubular openings being an inlet for fluid under pressure and the other being an outlet, two plates disposed transversely in said inlet opening closing said inlet, an annular flexible fold of frangible material sealing said inlet opening and rigidly held between said plates and attached to an adjacent part of said inlet opening, said plates and frangible material being directly supported by a shaft disposed longitudinally in said casing, said shaft having a longitudinal slot accommodating wedge-shaped pieces, said shaft and said wedge pieces being held slidably in a longitudinal direction in a suitably sized opening in a spider extending transversely across and rigidly attached to said casing, small springs in said slot of said shaft forcing said wedge pieces outward, said wedge pieces being also poised on a member supported by a spring abutting said casing at a part opposite to said inlet opening, said member being constructed and arranged to allow said portion of said shaft longitudinally slotted and containing said wedge pieces to pass slidably therethrough in a longitudinal direction when said wedge pieces are compressed in said portion of said shaft by an inlet pressure upon said plate and said frangible material equal to a predetermined pressure at which said frangible material will be ruptured.

2. A pressure release device comprising a casing having an inlet for fluid under pressure and an outlet, a shaft extending longitudinally in said casing supporting two plates extending transversely in said inlet opening and said shaft passing through a guide in a spider extending transversely in and rigidly attached to said casing and through an opening in a free annular member partially extending transversely across but unattached to said casing and terminating in a recess in said casing; an annular fold of frangible material sealing said inlet opening rigidly held between said plates and attached to an adjacent part of said inlet opening, a portion of said shaft being longitudinally slotted to accommodate wedge-shaped pieces, said portion of shaft and said wedge pieces being arranged in a suitably slotted opening in said spider, small springs in said slotted portion of said shaft forcing said wedges outwardly, said wedge pieces also being poised on said free annular member, said free annular member being supported by a spring surrounding said recess in said casing so that its opening permits said longitudinal slotted portion of said shaft containing said wedges to pass slidably therethrough in a longitudinal direction when said wedges are compressed in said portion of said shaft by an inlet pressure on said plates and frangible material equal to a predetermined pressure at which the frangible material will be ruptured.

3. A pressure release device comprising a casing having two tubular openings, one of said tubular openings being an inlet for fluid under pressure and the other being an outlet, a plate assembly disposed transversely in said inlet opening closing said inlet, a frangible diaphragm extending from the plate assembly across the inlet opening to seal the opening, the plate assembly and frangible diaphragm being directly supported by a shaft in the casing, said shaft having a longitudinal slot accommodating wedges, said shaft and said wedges being held slidably in a longitudinal direction in an opening in a spider extending transversely across the casing, springs in said slot of the shaft forcing the wedges outwardly against the spider, the wedges being also poised on a member supported by a spring abutting the casing, said member being suitably constructed and arranged to allow the portion of the shaft containing the wedges to pass slidably therethrough in a longitudinal direction when the wedges are compressed by a predetermined inlet pressure upon said plate assembly.

RICHARD W. TRYON.